United States Patent [19]
Gregg

[11] 3,720,840
[45] March 13, 1973

[54] WIND TURBINE GENERATOR WITH EXHAUST GAS HEATER

[76] Inventor: Hendrick J. Gregg, 625 S. Alton Way, Denver, Colo. 80231

[22] Filed: Oct. 6, 1971

[21] Appl. No.: 186,860

[52] U.S. Cl. ............................290/55, 60/59, 290/44
[51] Int. Cl. ..................................................F03d 9/00
[58] Field of Search ........60/59 T; 290/43, 44, 54, 55

[56] References Cited

UNITED STATES PATENTS

| 695,524 | 3/1902 | Woodell | 60/59 T |
| 237,986 | 2/1881 | Mansfield | 60/59 T |
| 667,744 | 2/1901 | Stolze | 60/59 T |
| 388,964 | 9/1888 | Godkin | 60/59 T |
| 3,339,078 | 8/1967 | Crompton | 290/44 |
| 2,485,543 | 10/1949 | Andreau | 290/55 |
| 1,013,798 | 1/1912 | Messina | 290/55 X |
| 1,783,669 | 12/1930 | Oliver | 290/44 X |

*Primary Examiner*—G. R. Simmons
*Attorney*—Richard L. Johnston et al.

[57] ABSTRACT

A gas turbine driven electric generator system is provided which makes it possible to utilize wind as the motive force and to reduce or eliminate pollution.

10 Claims, 3 Drawing Figures

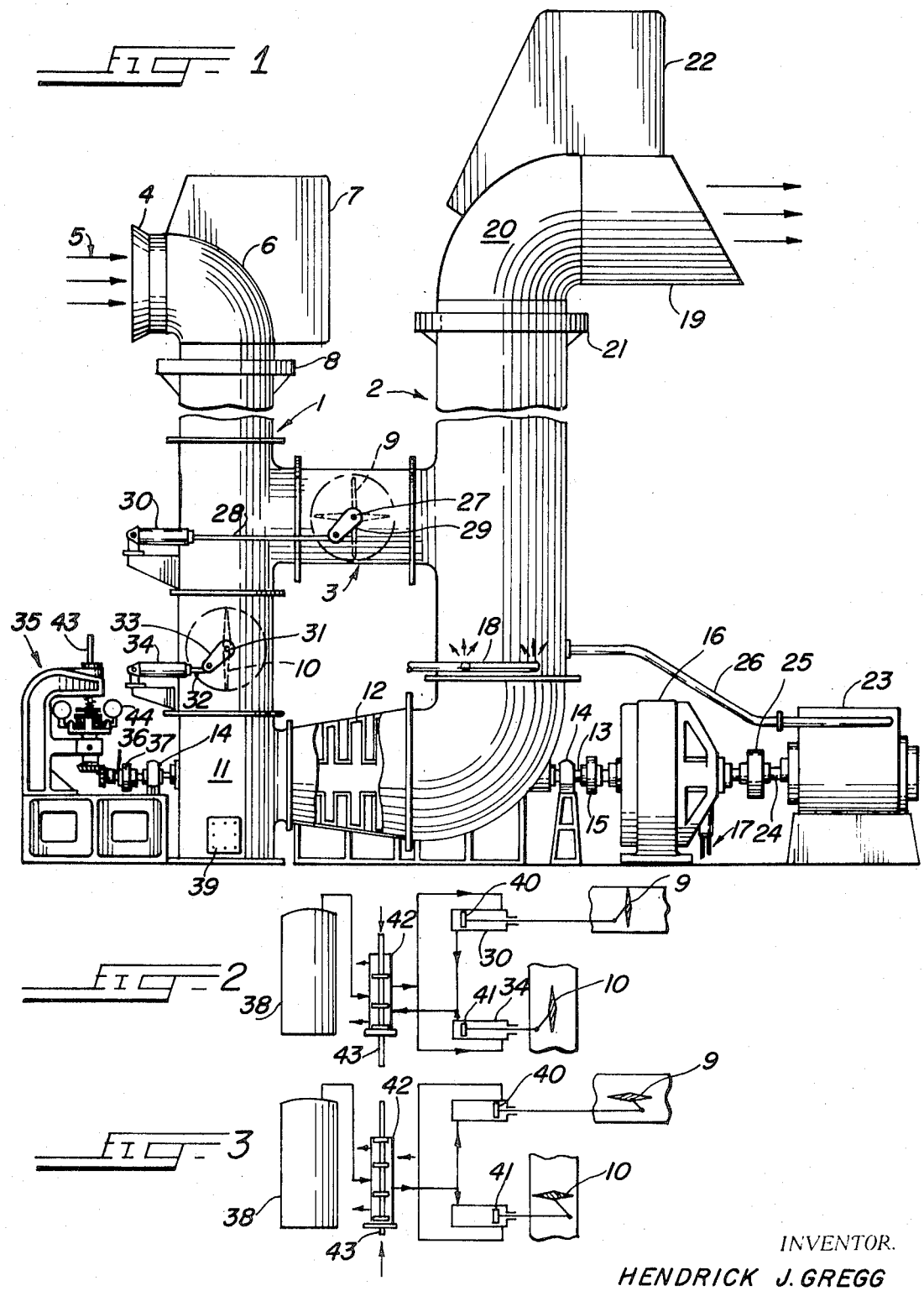

WIND TURBINE GENERATOR WITH EXHAUST GAS HEATER

BACKGROUND

Various attempts have been made to utilize wind as a motive force for generating electric power. Most of the devices that have been proposed are so-called windmills in which a propeller is driven by the wind and the shaft on which the propeller is mounted is drivingly connected to a generator. U.S. Pat. No. 2,004,853 gives an illustration of such an air operated power unit.

In U.S. Pat. No. 695,524 a fan or propeller connected to an electric generator is driven by suction from a vertical flue in which the air is heated. This type of device, however, does not attempt to capture wind and cannot create a very large gas velocity without employing a relatively large heat input.

It would be desirable to provide an electric generator system in which the natural wind currents are captured and utilized as a motive force. It would also be desirable to provide a system of the type described, the operation of which leads to the reduction or practical elimination of air pollution.

OBJECTS

With the foregoing desiderata in mind, one of the objects of the present invention is to provide a gas turbine driven electric generator system which makes it possible to capture and utilize wind as the gaseous motive force and to reduce or practically eliminate pollution of the air.

Another object of the invention is to provide a system of the type described in which the flow of gases in the system is controlled.

A further object of the invention is to provide a system of the type described in which auxiliary equipment is provided to take care of contingencies attributable to variations in wind velocity.

THE DRAWINGS

Other objects and advantages of the invention will appear from the following description in conjunction with the accompanying drawings in which:

FIG. 1 represents a side elevational view of an embodiment of the invention; and FIGS. 2 and 3 are diagrammatic views illustrating operational controls provided in accordance with the invention.

BRIEF SUMMARY OF THE INVENTION

In accordance with the invention an electric generator system is provided comprising an electric generator, a gas operated turbine drivingly connected to said generator, a gas entrance receiver on the inlet side of said turbine, an inlet stack connected at its exit end to said gas receiver, inlet means for gas at the entrance end of said stack, an exhaust stack connected at its entrance end to the exhaust side of said turbine and adapted to discharge exhaust gases through its exit end, and means in said exhaust stack for heating said exhaust gases.

In the practice of the invention the exhaust stack is normally adapted to carry a larger volume of gas than the inlet stack. The system provided in accordance with the invention preferably comprises means at the entrance end of the inlet stack for capturing gases moving in a substantial horizontal direction and adapted to adjust to the direction of maximum gas flow. The system also preferably comprises means at the exit end of the exhaust stack for discharging exhaust gases in a substantial horizontal direction and adapted to adjust to the direction of maximum gas flow. In addition, the system preferably comprises means to control the flow of gases in response to gas requirements of the turbine. Finally, the system preferably comprises means for operating the electric generator on a stand-by basis when the gas requirements furnished by wind flow are insufficient.

DETAILED DESCRIPTION OF THE INVENTION

Referring to FIG. 1, the embodiment illustrated comprises an inlet stack generally shown at 1 and an outlet stack generally shown at 2 connected by a passageway generally shown at 3.

The inlet stack 1 is provided with a funnel-shaped entrance end 4 adapted to capture wind 5 moving in a substantial horizontal direction. The end 4 is connected to an elbow 6 which contains a vane 7 and is mounted on a swivel 8. Vane 7 will cause end 4 of inlet stack 1 to swivel and to maintain a position where the maximum wind velocity will be captured by inlet end 4.

Passageway 3 contains a damper 9 which is normally closed and the inlet stack 1 contains a damper 10 which is normally open so that wind entering inlet stack 1 will pass to a receiver 11 and thence to a gas turbine 12. The gas turbine 12 is mounted with a through shaft 13 supported by suitable bearings 14,14 and connected through a clutch 15 to an electric generator 16. Thus, the rotation of the vanes in multistage turbine 12 drives electric generator 16 and the electricity generated is removed through cables 17 to a suitable storage system, for example, storage batteries, not shown.

In order to increase the efficiency of the operation, a heating unit 18 is disposed in exhaust stack 2 and the heat thereby provided accelerates the flow of gases through the outlet 19 of the exhaust stack 2. The exit end 19 is connected by an elbow 20 to a swivel mechanism 21 and is provided with a vane 22 which controls the position of exit end 19 in accordance with the wind velocity and causes the exhaust gases to be discharged in the direction of wind flow. The heating unit 18 can be, for example, an electrical heating unit or a gas heating unit in which the gases of combustion are also discharged into the exhaust stack and tend to accelerate the suction effect created by the flow of gases discharged from the exhaust stack.

A stand-by prime mover, e.g., a gas turbine or a steam turbine or an internal combustion engine is provided as auxiliary equipment in case the variation in wind flow does not permit the usual operation of this system. For example, internal combustion engine 23 is connected through shaft 24 and clutch 25 to generator 16 and the exhaust pipe 26 is connected to exhaust stack 2.

In normal operation clutch 15 is engaged and clutch 25 is disengaged. In stand-by operation when internal combustion engine 23 is used, clutch 15 is disengaged and clutch 25 is engaged.

Damper 9 is capable of movement from the vertical or closed position to a horizontal or fully open position or to any intermediate point by being mounted on a shaft 27 connected to piston rod 28 by link 29, rod 28 being connected to a piston in cylinder 30. Similarly, damper 10 is mounted for rotation on shaft 31 which is connected to piston rod 32 by link 33, rod 32 being connected to a piston in cylinder 34.

Optionally, a governor 35 is provided to control the speed of gas turbine 12 and is connected to gas turbine 12 by a shaft 36 through coupling 37 and bearing 14 which is mounted on a suitable supporting structure.

A clean-out plate 39 is provided at the lower end of receiver 11.

The operation of dampers 9 and 10 is illustrated diagrammatically in FIGS. 2 and 3. As shown in FIG. 2, in the usual operation when wind is blowing through inlet opening 4, damper 9 is closed and the piston 40 in cylinder 30 is retracted. At the same time damper 10 is open and the piston 41 in cylinder 34 is retracted. Both pistons are operated from a piston valve 42 connected to receiver tank 38.

When the wind velocity becomes excessive, damper 9 is automatically opened and damper 10 is closed due to the fact that fluid from the piston valve 42 causes pistons 40 and 41 to be advanced. The excess wind then spills through passageway 3 to the exhaust stack 2.

The stem 43 of piston valve 42 is connected to governor 35 and is movable axially in response to the speed of rotation of shaft 36 connected to turbine 12. When the fly balls 44 of governor 35 are collapsed as is the case when the speed of rotation is not excessive, the valve stems 43 will be down and dampers 9 and 10 will occupy the positions shown in FIG. 2. On the other hand, when fly balls 44 are expanded due to excessive speed of rotation of turbine 12 valve stem 43 will be up and the dampers 9 and 10 will occupy the positions shown in FIG. 3.

The size of the stacks 1 and 2 will vary depending upon conditions. Thus where a system of this type is used on a ship they will be relatively short. On the other hand, in a stationary land location, the cold intake stack 1 could be 10 feet in diameter by as much as 100 feet high and the warm exhaust stack 2 could be 14 feet in diameter by as much as 130 feet high. The average diameter of the multi-stage turbine wheels could be around 12 feet or larger.

It will be recognized that various other types of speed control devices can be used to protect the system against vibration and high winds. Thus, an electrical control system using limit switches and solenoid valves might be employed instead of the type of system illustrated in the drawings. Various devices can be used to start and/or stop heating element 18 in exhaust stack 2. Suitable devices can also be used to start stand-by engine 23 in case of insufficient wind velocity. Other devices can be used to cut off the flow of electricity through lines 17 when the batteries are fully charged and magnetic clutches can be employed at 15 and 25 to engage and disengage the operating shafts to generator 16 when required.

The invention makes it possible to utilize wind currents in order to generate electricity which can be stored and used as required. The invention also makes it possible to generate electricity without polluting the atmosphere or with a minimum of atmospheric pollution.

The invention is hereby claimed as follows:

1. An electric generator system comprising an electric generator, a gas operated turbine drivingly connected to said generator, a gas receiver on the inlet side of said turbine, a wind inlet stack connected at its exit end to said gas receiver, inlet means for wind at the entrance end of said stack, an exhaust stack connected at its entrance end to the exhaust side of said turbine and adapted to discharge exhaust gases through its exit end, and means in said exhaust stack for heating said exhaust gases to enhance the flow.

2. A system as claimed in claim 1 comprising means at the outer end of said inlet stack for capturing gases moving in a substantial horizontal direction.

3. A system as claimed in claim 2 in which said means for capturing gases swivels on said stack and contains vanes adapted to adjust the position of said means in the direction of maximum gas flow.

4. A system as claimed in claim 1 comprising means at the exit end of said exhaust stack for discharging exhaust gases in a substantial horizontal direction.

5. A system as claimed in claim 1 in which said means for discharging gases swivels on said exhaust stack and contains vanes adapted to adjust the position of said means in the direction of maximum gas flow.

6. A system as claimed in claim 1 in which said exhaust stack is adapted to carry a larger volume of gas than said inlet stack.

7. A system as claimed in claim 1 comprising means to control the flow of gases in said system.

8. A system as claimed in claim 1 in which said inlet stack contains a damper ahead of said receiver, a passageway connects said inlet stack to said exhaust stack at a point between said damper and said inlet means, and said passageway contains a damper.

9. A system as claimed in claim 8 comprising means to control the operation of said dampers in response to gas requirements of said turbine.

10. A system as claimed in claim 1 in which said generator is connected through clutch means to a stand-by prime mover and the exhaust from said prime mover is connected to said exhaust stack.

* * * * *